Patented Apr. 7, 1936

2,036,196

UNITED STATES PATENT OFFICE 2,036,196

APPLICATION OF DYESTUFFS

Norman Chappell, Norman Hulton Haddock, and Frank Lodge, Blackley, England, assignors to Imperial Chemical Industries Limited, a corporation of Great Britain No Drawing. Application May 14, 1934, Serial No. 725,652. In Great Britain May 18, 1933

5 Claims. (Cl. 8—5)

In British specification No. 377,740 there is described a process for the production of fast dyeings on textile fibers by applying to the fiber an o-aminoanthraquinonylthioglycollic acid and lactamizing this by treatment with dilute mineral acid at an elevated temperature.

The present invention comprises a new process for the production of fast dyeings on textile fibers, particularly animal fibers, which consists in the application thereto of a new class of compounds, namely o-aminophenylthioglycollic acids carrying an anthraquinonyl substituent, as further defined below, and the lactamization of the applied compounds by treating with dilute mineral acid at an elevated temperature.

The invention also comprises a process as in the preceding paragraph in which the o-aminophenylthioglycollic acids are applied from a bath which is acidified by ammonium acetate, ammonium anthranilate, ammonium phosphate, a mixture of ammonium sulphate and ammonia or anthranilic acid. Use of these acids in the dyebath permits addition of the whole of the acid to be used in the dyeing (as distinct from that used in the lactamization) to be added at the beginning of the dyeing operation and in general gives dyeings of greater fastness to rubbing.

Working according to our invention it is possible to obtain dyeings of greater fastness, especially fastness to potting and alkaline processes, and brightness than those described in the above mentioned specification, and in general the fastness to potting and alkaline process on wool is very good to excellent.

We further define our o-aminoanthraquinonylthioglycollic acids carrying an anthraquinonyl substituent, as compounds of the constitution $$Aq-X-C_6H_3\begin{cases}NH_2\\S\,CHR\,CO_2H\end{cases}$$

where $C_6H_3$ is the residue of a phenyl nucleus carrying as substitutents amino and thioglycollic acid groups ortho to each other and an anthraquinonyl radical, represented by Aq attached to a linking group X, and where R stands for H, $CH_3$— or $C_2H_5$—, and X stands for a simple divalent radical derived from an auxochromic group such as —NH—, —S—, —NHCO—, —CONH— or $NH \cdot SO_2$—, and where Aq may be further substituted by bromine or chlorine atoms or hydroxyl, alkoxyl, amino, alkylamino, acylamino, arylamino groups and the phenyl residue may be further substituted by bromine or chlorine atoms or methyl groups. Further, one anthraquinonyl substituent may be shared by two o-aminophenylthioglycollic acid radicals.

These bodies may be prepared by the methods described in copending U. S. applications Ser. Nos. 682,728; 689,044; 702,416; 702,646 and 641,114.

The following examples in which parts are by weight are given to illustrate our invention, it being understood that any of the compounds falling within the definition of the products above given may be substituted for those used in these specific examples.

Example 1

The sodium salt of the acid of the constitution

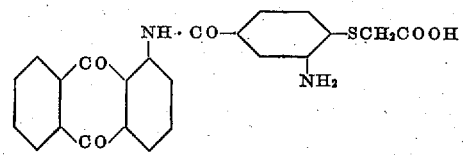

is applied to wool in the following manner. 2 parts of the salt are dissolved in 2000 parts of water at 80° C. 50 parts of wet wool are added, followed by 2 parts of ammonium acetate previously dissolved in water. The dyebath is maintained at 85–90°, with gentle agitation for 1–1½ hours. The wool is then rinsed in cold water and entered cold or luke-warm into a solution of 3 parts of sulphuric acid in 2000 parts of water. The temperature is raised to 80° C., and kept at this 1 hour. The wool is removed, rinsed in water and treated with a solution of a mild detergent e. g. 4 parts of cetyl sodium sulphate in 2000 parts of water, at 45° C. for about ¼ hour to remove any traces of loosely adhering color. It is finally dried. The wool is dyed a very bright yellow shade, of excellent fastness to washing, milling and potting. The fastness to potting is equivalent to that obtained with chrome colors and much higher than that generally obtained with acid colors.

Example 2

In the above example, instead of using 2 parts of ammonium acetate, a solution containing 2.5 parts of anthranilic acid, neutralized with ammonia, may be substituted.

Example 3

The product used in Example 1 may also be applied to wool in the following manner. 2 parts of the product are dissolved in 2000 parts of water at 80° C. 50 parts of wet wool are added, followed by 2 parts of ammonium acetate previously dissolved in water. The dyebath is maintained 85–90°, with gentle agitation, for 1–1½ hours. The wool is then rinsed in cold water and entered cold or luke-warm into a solution of 3 parts of sulphuric acid and 2 parts of cetyl pyridinium bromide in 2000 parts of water. The temperature is raised to 80° C., and kept at this for ¼ hour. The wool is removed, rinsed in water, and treated with water to remove any traces of adhering color. It is finally dried. The wool is dyed a very bright yellow shade.

*Example 4*

The sodium salt of the acid of the constitution

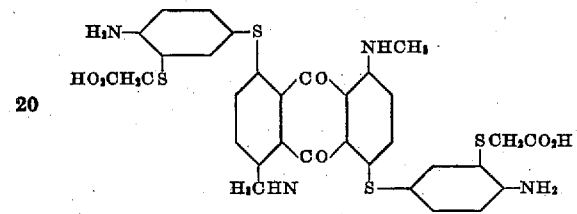

is applied to wool in the following manner. 2 parts of the dye-stuff are dissolved in 2000 parts of water at 80° C. and a solution of 2½ parts of the sodium salt of the formaldehyde-naphthalene sulphonic acid condensation product are added. 50 parts of wet wool are added, followed by a solution of 2 parts of ammonium acetate. The dyebath is maintained at 85–90° C., for 1–1½ hours. The wool is rinsed in cold water and entered warm or luke-warm into a solution of 3 parts of sulphuric acid in 2000 parts of water. The temperature is raised to 80° C. and maintained at this for about 1 hour. The wool is rinsed in warm water and treated with a mild detergent e. g. 4 parts of cetyl sodium sulphate in 2000 parts of water at 45° C. for ¼ hour to remove any trace of adhering loose color. The wool is dyed a bright blue of excellent fastness to washing, milling and potting.

*Example 5*

The product used in Example 4 is applied to silk in the following manner. 1½ parts are dissolved in 2000 parts of water at 80° C., 50 parts of wet silk are added, followed by a solution of 2 parts ammonium acetate. The dyebath is maintained at 85–90° C. for 1–1½ hours. The fiber is rinsed in cold water and entered cold or lukewarm into a solution of 3 parts of sulphuric acid in 2000 parts of water. The temperature is raised to 80° C., and maintained at this for about 1 hour. The fiber is rinsed in warm water and treated with a mild detergent, e. g. 4 parts of cetyl sodium sulphate in 2000 parts of water at 45° C. for ¼ hour to remove any trace of loosely adhering color. The silk is dyed a bright blue of good fastness to washing.

*Example 6*

The sodium salt of the acid of the following constitution

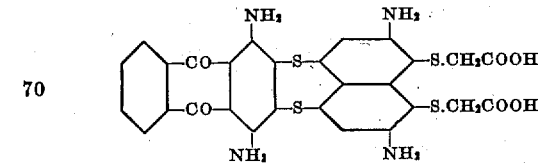

is applied to wool in the following manner. 2 parts of dyestuff are dissolved in 2000 parts of water at 80° C. and 50 parts of wet wool added. 50 parts of 10% sodium sulphate solution are added and the dyebath kept at 90–95° C. for 1½–2 hours. The wool is removed, rinsed in cold water, or if desired a cold or lukewarm solution of 4 parts of cetyl sodium sulphate in 2000 parts of water, and immersed in a solution of 3 parts of sulphuric acid in 2000 parts of water. The temperature is raised to 80–85° C. and kept at this for about 1 hour. The wool is rinsed with a solution of cetyl sodium sulphate as before and dried. It is dyed a bright blue of excellent fastness to light, washing, potting and milling.

*Example 7*

The sodium salt of the acid of constitution

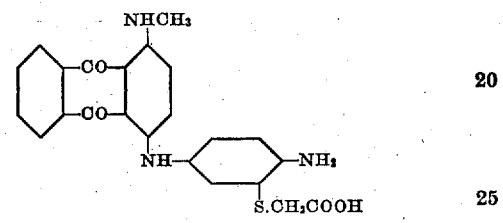

is applied to wool as follows. 2 parts of the dyestuff are dissolved in 2000 parts of water at 80° C. 50 parts of wool are added and the temperature raised to 90° C. During 1 hour 30 parts of 1% acetic acid are slowly added. Keeping the wool gently moving in the bath and the temperature at 90–95° C. The wool is removed, rinsed in cold water and put into a bath made from 3 parts of sulphuric acid and 2000 parts of water. The temperature is raised to 80° C. and kept at this for about 1 hour. The dyeing is rinsed in cold water and dried. The shade is greenish blue and of excellent fastness to light.

The shades obtainable from other dyestuffs are given in the following table:

| Dyestuff | Direct shade | Shade after lactamization |
|---|---|---|
| ![structure with S-CH₂COONa, NH-, NH₂, CO, OH groups] | Bluish-green | Green |
| ![structure with NH₂, CO, CONH, S-CH₂COONa, NH₂, NHSO₂, CH₃] | Reddish-violet | Violet |
| ![structure with NH-CH₃, CO, NH-SO₂, S-CH₂COONa, NH₂] | Reddish-violet | Violet |
| ![structure with NHCO, S-CH₂COONa, NH₂, CO, OCH₃] | Orange-yellow | Yellow |

| Dyestuff | Direct shade | Shade after lactamization |
|---|---|---|
| (structure) | Bluish-green | Green |
| (structure) | Orange | Scarlet |
| (structure) | Bluish-green | Green |
| (structure) | Reddish-blue | Violet |
| (structure) | Reddish-blue | Bluish-violet |
| (structure) | Reddish-blue | Reddish-blue |
| (structure) | Bluish-violet | Violet |
| (structure) | Brownish red | Red |

Other dilute mineral acids such as hydrobromic, hydrochloric, nitric acids may be used for developing the color on the fiber in place of the sulfuric acid specified in the specific examples.

We claim:

1. In the process of dyeing textile fibers with anthraquinonyl-o-aminophenylthioglycollic acid dyestuffs of the following formula

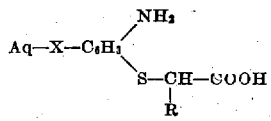

where $C_6H_3$ is the residue of a phenyl nucleus carrying as substituents amino and thioglycollic acid groups ortho to each other and an anthraquinonyl radical attached to a linking group X, and where R stands for H, $CH_3$— or $C_2H_5$—, and X stands for a radical of the group consisting of —H—, —S—, —NHCO—, —CONH— or $N.H.SO_2$—, and where Aq may be further substituted by bromine or chlorine atoms or hydroxy, alkoxyl, amino, alkylamino, acylamino, arylamino groups and the phenyl residue may be further substituted by bromine or chlorine atoms or methyl groups, the step which comprises applying the dyestuff to the fiber from an aqueous solution containing a salt which under the conditions at which the dyeing is carried out will keep the solution continually acidified throughout the dyeing operation.

2. The process as defined in claim 1, wherein the temperature of the bath is maintained at temperatures of about 90° C.

3. In the process of dyeing textile fibers with anthraquinonyl-o-aminophenylthioglycollic acid dyestuffs, the steps which comprise applying to the fiber from an aqueous solution kept continually acidified throughout the dyeing operation by the liberation of an acid therein from a salt, dyestuffs of the formula

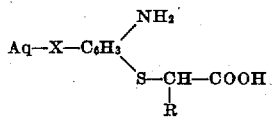

where $C_6H_3$ is the residue of a phenyl nucleus carrying as substituents amino and thioglycollic acid groups ortho to each other and an anthraquinonyl radical attached to a linking group X, and where R stands for H, $CH_3$— or $C_2H_5$—, and X stands for a radical of the group consisting of —NH—, —S—, —NHCO—, —CONH— or $NH.SO_2$, and where Aq may be further substituted by bromine or chlorine atoms or hydroxyl, alkoxyl, amino, alkylamino, acylamino, arylamino groups and the phenyl residue may be further substituted by bromine or chlorine atoms or methyl groups, and developing the color on the fiber by heating in a dilute mineral acid solution.

4. In the process of dyeing textile fibers with anthraquinonyl-o-aminophenylthioglycollic acid dyestuffs, the steps which comprise applying to the fiber from an aqueous solution kept continually acid throughout the dyeing operation, dyestuffs of the formula

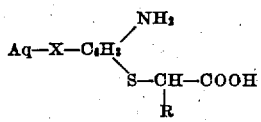

where $C_6H_3$ is the residue of a phenyl nucleus carrying as substituents amino and thioglycollic acid groups ortho to each other and an anthraquinonyl radical attached to a linking group X, and where R stands for H, $CH_3$— or $C_2H_5$—, and X stands for a radical of the group consisting of —NH—, —S—, —NHCO—, —CONH— or $NH.SO_2$, and where Aq may be further substituted by bromine or chlorine atoms or hydroxyl, alkoxyl, amino, alkylamino, acylamino, arylamino groups and the phenyl residue may be further substituted by bromine or chlorine atoms or methyl groups.

5. In the process of dyeing textile fibers with anthraquinonyl-o-aminophenylthioglycollic acid dyestuffs, the steps which comprise applying to the fiber from an aqueous solution kept continually acid throughout the dyeing operation dyestuffs of the formula

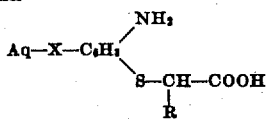

where $C_6H_3$ is the residue of a phenyl nucleus carrying as substituents amino and thioglycollic acid groups ortho to each other and an anthraquinonyl radical attached to a linking group X, and where R stands for H, $CH_3$—, or $C_2H_5$—, and X stands for a radical of the group consisting of —NH—, —S—, —NHCO—, —CONH— or $NH.SO_2$—, and where Aq may be further substituted by bromine or chlorine atoms or hydroxyl, alkoxyl, amino, alkylamino, acylamino, arylamino groups and the phenyl residue may be further substituted by bromine or chlorine atoms or methyl groups, and developing the color on the fiber by heating in a dilute mineral acid solution.

NORMAN CHAPPELL.
NORMAN HULTON HADDOCK.
FRANK LODGE.

CERTIFICATE OF CORRECTION.

Patent No. 2,036,196.   April 7, 1936.

NORMAN CHAPPELL, ET AL.

It is hereby certified that error appears in the printed specification of the above numbered patent requiring correction as follows: Page 1, first column, line 35, for "o-aminoanthraqinonyl-" read o-aminoanthraquinonyl-; page 2, first column, line 3, after the syllable "tained" insert the word at; and page 3, second column, line 15, claim 1, for "-H-" read-NH-; and that the said Letters Patent should be read with these corrections therein that the same may conform to the record of the case in the Patent Office.

Signed and sealed this 14th day of July, A. D. 1936.

Henry Van Arsdale (Seal)    Acting Commissioner of Patents.

tuted by bromine or chlorine atoms or hydroxyl, alkoxyl, amino, alkylamino, acylamino, arylamino groups and the phenyl residue may be further substituted by bromine or chlorine atoms or methyl groups.

5. In the process of dyeing textile fibers with anthraquinonyl-o-aminophenylthioglycollic acid dyestuffs, the steps which comprise applying to the fiber from an aqueous solution kept continually acid throughout the dyeing operation dyestuffs of the formula

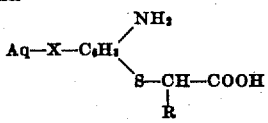

where $C_6H_3$ is the residue of a phenyl nucleus carrying as substituents amino and thioglycollic acid groups ortho to each other and an anthraquinonyl radical attached to a linking group X, and where R stands for H, $CH_3$—, or $C_2H_5$—, and X stands for a radical of the group consisting of —NH—, —S—, —NHCO—, —CONH— or $NH.SO_2$—, and where Aq may be further substituted by bromine or chlorine atoms or hydroxyl, alkoxyl, amino, alkylamino, acylamino, arylamino groups and the phenyl residue may be further substituted by bromine or chlorine atoms or methyl groups, and developing the color on the fiber by heating in a dilute mineral acid solution.

NORMAN CHAPPELL.
NORMAN HULTON HADDOCK.
FRANK LODGE.

CERTIFICATE OF CORRECTION.

Patent No. 2,036,196.                                    April 7, 1936.

NORMAN CHAPPELL, ET AL.

It is hereby certified that error appears in the printed specification of the above numbered patent requiring correction as follows: Page 1, first column, line 35, for "o-aminoanthraqinonyl-" read o-aminoanthraquinonyl-; page 2, first column, line 3, after the syllable "tained" insert the word at; and page 3, second column, line 15, claim 1, for "-H-" read -NH-; and that the said Letters Patent should be read with these corrections therein that the same may conform to the record of the case in the Patent Office.

Signed and sealed this 14th day of July, A. D. 1936.

Henry Van Arsdale (Seal)

Acting Commissioner of Patents.

CERTIFICATE OF CORRECTION.

Patent No. 2,036,196. April 7, 1936.

NORMAN CHAPPELL, ET AL.

It is hereby certified that error appears in the printed specification of the above numbered patent requiring correction as follows: Page 1, first column, line 35, for "o-aminoanthraqinonyl-" read o-aminoanthraquinonyl-; page 2, first column, line 3, after the syllable "tained" insert the word at; and page 3, second column, line 15, claim 1, for "-H-" read-NH-; and that the said Letters Patent should be read with these corrections therein that the same may conform to the record of the case in the Patent Office.

Signed and sealed this 14th day of July, A. D. 1936.

Henry Van Arsdale (Seal)

Acting Commissioner of Patents.